Figure 1:
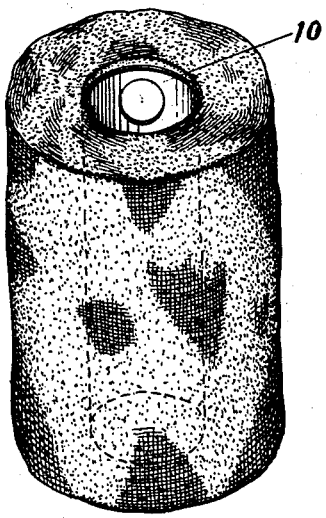

Nov. 1, 1938.  H. M. WEBER  2,134,963
PLASTER BANDAGE
Filed Feb. 16, 1935

Inventor
Harry M. Weber.
by Kenway & Witter
Attorneys

Patented Nov. 1, 1938

2,134,963

UNITED STATES PATENT OFFICE 2,134,963

PLASTER BANDAGE

Harry M. Weber, Newton, Mass.

Application February 16, 1935, Serial No. 6,881

8 Claims. (Cl. 128—91)

This invention relates to the preparation of plaster of Paris bandages for surgical or other uses and consists in a novel process of preparing non-dusting bandages of this nature. The present application is a continuation in part of my co-pending application Serial No. 748,112, which has matured into Pat. No. 2,009,597.

Two types of bandages containing plaster of Paris have heretofore been used for the application of surgical casts. One in which loose plaster of Paris is spread as evenly as possible on starch or glue sized or unsized gauze and the gauze is then rolled as compactly as possible. The plaster dusts out of such rolls with comparative ease when they are handled. This results not only in the loss of the plaster but is also a source of annoyance, particularly when such plasters are used in the home or a surgeon's office. Furthermore, when wetted prior to application in the usual manner by setting the roll on one end in a body of water, the plaster tends to fall to one end of the roll. This uneven distribution tends to make the even application of the plaster quite difficult. Considerable plaster is also likely to be lost at this point and it is difficult to control such loss.

In the second type, or so called hard-coated bandages, plaster of Paris is held on the gauze by means of an adhesive or binder. Such a bandage has obvious advantages over the loose plaster type, in that dusting, settling and loss of the plaster is minimized. Furthermore, by tightly winding such bandages in a roll, the quantity of water taken up by the bandage can be to some extent controlled. As is well known, the ultimate strength of a plaster of Paris cast is seriously affected by any excess water used and consequently the addition to the bandage of the correct amount of water is a matter of considerable importance.

The present invention deals with the production of bandages of the second or hard-coated type and particularly those in which the quantity of water taken up on immersion can be to some extent controlled. Heretofore such bandages have been prepared by coating starch sized or unsized gauze with a paste made up of plaster of Paris, water, a water soluble binder, such as dextrine, and a material that acts as a retarder in the setting of plaster of Paris, such as acetic acid. The coated gauze is then dried at an elevated temperature, or by treating a roll of gauze containing loose plaster of Paris with a solution of a binding material such as gum arabic and a decomposable retarder such as the ammonium salts and drying at an elevated temperature to obtain a thin, protective, water permeable coating on the exterior surfaces. Bandages prepared in this manner while of value for surgical purposes, have serious disadvantages. Casts prepared from them are not as strong in the wet state, that is, immediately after the initial set has taken place, as those prepared from an equivalent amount of plaster of Paris used in a loose plaster bandage. One cause of the loss of strength is the difficulty of eliminating all of the acid or other material used as a retarder in the preparation of the bandage. This leads to the use of excessive amounts of accelerators of the setting of plaster of Paris when equivalent or speedier setting is required. The presence of the acid material also slows the drying of the cast and consequently increases the time for the cast to acquire its maximum strength. This slowing action is particularly noticeable and objectionable on damp or wet days. In some cases it has been found necessary to use a blast of heated air on the cast to accelerate the drying and render the cast of sufficient strength, within a reasonable period of time, to serve the purpose for which it is used.

It is an object of the present invention to produce a bandage or a bandage unit free from the foregoing and other objectionable features of the present day hard-coated bandages and having other advantages which will apear hereinafter. Another object is to reduce the cost of such bandages.

In order that the present invention may be fully understood, a brief description follows of the requirements that a bandage of this nature should fulfill. Of primary importance from both the surgeon's and patient's standpoint is that the time required to apply the bandage be as short as possible. Consequently the plaster should permit a sufficient period of time for the application of the cast and then set and attain strength rapidly while in the wet state, in order that the time that it is necessary to hold a broken limb, for example, in position should not be unduly long. Another requirement is that of high strength while in the wet state as otherwise the cast must be of objectionable bulk to support the broken part. Therefore the desirability of a plaster bandage may be said to be governed by its strength one hour or less after its application, or in the wet state.

The setting time of the plaster may vary depending upon the size of the cast to be applied, the skill of the surgeon making the cast and the technique used.

In my prior Patent No. 2,009,597 I have described the preparation of hard coated plaster of Paris bandages by applying to a sheet of gauze a paste consisting of gypsum, a binder and a solvent and subsequently drying and dehydrating the coating by suitable heat treatment. I have also discovered that satisfactory plaster bandages for surgical and other purposes can be prepared by other though somewhat analogous processes and these are the object of the present application. In these processes, dry powdered gypsum is spread on surgical gauze of suitable mesh and size and the gauze wound into a compact roll. The roll is then dipped into a solution containing a suitable binder, removed and then dried and the gypsum dehydrated to plaster of Paris by suitable heat treatment. Or, a dry mixture of gypsum and a suitable binder is spread on gauze and wound into a roll and the resulting roll dipped into a suitable solvent for the binder and subsequently suitably heat treating the dipped roll. Stable accelerating or retarding agents of the setting time of plaster of Paris can be introduced either by the addition of these materials to the solution containing the binder or in dry form to the gypsum or the gypsum binder mixture prior to spreading on the gauze. In this manner, a non-dusting plaster of Paris bandage was obtained having many desirable properties.

It might be supposed that upon raising the temperature of the wet mass to a point at which the gypsum loses water of crystallization, the steam so generated would destroy the effect of the binder on the constituents of the bandage. The contrary was found to be true, as the bandage roll retains its shape, is practically dustless, and is in the form of a compact, porous mass. If, however, the bandage is unrolled in the dry state, the plaster crumbles and dusts and only adheres to the gauze in part and in this respect differs materially from the bandage of my copending application. When immersed in water the mass retains its shape and is readily and evenly saturated with water, whereupon the unit may be unrolled to provide a plastic bandage ready for use.

The obvious advantages of the process are readily apparent in that but one heat treatment of the gypsum is necessary. In addition, local superheating of the gypsum resulting in the formation of anhydrous calcium sulfate, such as occurs in present processes of manufacturing plaster of Paris is largely overcome. Consequently the need of ageing or tempering the plaster by standing or by the use of some chemical agent for this purpose during the manufacture is unnecessary.

Furthermore, the quantity of water absorbed by the bandage may be largely controlled by regulating the tightness of the roll in which the gypsum and gauze and other materials if present, are wound in the dry state. It is a further object of this invention so to regulate the water absorbing capacity of such bandages and also reduce the time required to evenly saturate them in comparison to similar bandages as marketed at present.

Plaster casts made from bandages prepared in the manner above outlined are of greater strength when in the wet state than those prepared in an equivalent manner from loose plaster rolled in gauze or from hard-coated plaster bandages as marketed at present. The increase in strength of my improved bandage is as much as fifty per cent or more. The probable explanation of this greater strength lies in the smaller amount of gypsum converted to the anhydrous salt in the plaster; and also in the well known fact that the dehydration of set plaster of Paris to the hemihydrate results in the production of a material giving a cast of lesser strength when again set with water.

The amount of plaster that can be applied to the gauze by this process can be varied within wide limits, such amount ranging from 0.04 grm. to 0.4 grm. per square inch of gauze. Greater amounts may be applied if necessary but present surgical practice requires a bandage containing approximately 0.24 grm. per square inch of gauze. This requirement is determined on a strength-weight basis.

Preferably this proportion of plaster-gauze is used as practice has shown this to be best adapted to the surgeon's needs. That is, greater amounts present some difficulty in application due to lack of gauze foundation to build the cast upon, resulting in the loss of plaster in greater amount that adheres to the operator's hands. A lesser amount of plaster to gauze results in voids in the cast or uneven filling of the meshes of the gauze with plaster with a consequent loss of strength. By using smaller amounts of plaster there is always the danger of the plaster "leaving", that is, one or more layers of the plaster impregnated gauze separating from those previously applied, resulting in the destruction of the cast.

Aside from the simplicity of manufacture, several advantages present themselves in practice due to the additional strength of the wet cast prepared from bandages made in accordance with the present invention. First, in the additional security of a cast of a given weight when compared with that obtained from present day plasters; second, in the reduction in the length of gauze required in a cast of given strength and, inasmuch as the gauze is the more expensive constituent of the bandage, a resulting reduction in the cost of the cast; third, in a reduction in the time required to apply a cast as this is almost proportional to the length of bandage used and, consequently, a faster setting plaster may be used and the patient at rest in a shorter period of time; and fourth, in the reduction of the weight of the cast necessary for a given purpose.

One method of preparing the plaster of Paris bandage in accordance with the present invention is as follows 100 grams of finely ground gypsum, preferably containing 92% or more of calcium sulfate is spread evenly on five yards of two inch surgical gauze by any suitable means and wound into a compact roll. The resulting gypsum gauze roll is then dipped into a solution consisting of a predetermined amount of binding material such as starch, resins, dextrine, gums, heat stable salts and the like and a solvent such as benzole, water, alcohols and the like until saturated and then removed. At this point, a small loss of gypsum from the roll may take place. The saturated roll is then placed in a suitable oven maintained at a temperature of 130° C. until it is dried and the gypsum dehydrated to plaster of Paris or the bandage roll reaches a temperature of 123–125° C.

Or, 400 grams of finely ground gypsum is mixed with two grams of binder the mixture spread evenly on 20 yards of 2 in. surgical gauze and wound into suitably sized rolls as in the above. The rolls are then saturated with a suitable solvent by dipping them into a body of this material whereby solution of the binder takes place within the rolls. The rolls are then removed, and dried and the gypsum dehydrated as in the foregoing example.

Suitable heat stable accelerating agents such as potash alum, potassium sulfate etc., can be added to the dry gypsum-binder mixture either in solution or dry state before spreading it on the gauze when desired. On the other hand, retarding agents such as blood, glue, etc., for the setting time of plaster of Paris may be added when desirable in a similar manner. Or, such agents may be added to the solvents used to saturate the rolls.

For example, 400 parts of finely ground gypsum was mixed with 2 parts of soluble starch and 1 part of potassium aluminum sulfate and the dry mixture spread on suitable lengths of surgical gauze and made up into compact rolls. The rolls were then dipped in water, absorbing between 50 and 60% of their weight of this material. They were then dried and the gypsum dehydrated in an oven maintained at a temperature of 130° C. until the temperature of the rolls reached 123–125° C. This required approximately 8 hours under the conditions used. The product was a porous, compact mass that was practically dustless when handled in a normal manner. When the bandages so prepared were immersed in water, they absorbed between 50% and 70% of their weight of this material in less than 1 minute. Casts prepared from the bandages, set rapidly and reached a satisfactory strength in less than thirty minutes time.

Preferably the binder and accelerator or retarder are dissolved in a suitable solvent and the gypsum-gauze rolls saturated with the resulting solution. The concentration of the solution may vary depending upon the quantity of solution absorbed by the rolls and the quantity of these materials desired in the finished product. Preferably the roll is wound under sufficient tension so that it will absorb between 40% and 55% of its weight of water when this material is used as the solvent. After dehydration such rolls will absorb between 50% and 65% of their weight upon immersion in water or a suitable amount to insure proper workability of the plaster mass. The concentration of the binder and accelerator or retarder if used, can readily be determined so as to obtain any desired proportion of these constituents to the insoluble solids. Such proportions may be varied between rather wide limits depending to some extent on the materials used, and the setting time desired in the finished product. To illustrate, using soluble starch or dextrine as a binder solution concentrations that will result in a binder-gypsum ratio of 0.1 to 2 parts of such binders to 100 parts of gypsum may be used. Greater or lesser quantities may in some cases be desirable and therefore used but satisfactory results have been obtained using these proportions. Concentration of the accelerators or retarders used may be within equally wide limits.

For example, 100 grms. of gypsum ground to pass an eighty mesh screen, was spread on 5 yds. of 2 in. 32 by 28 mesh surgical gauze and made up into rolls. The rolls were dipped into an aqueous solution made up of 375 grams water, 2 grams of soluble starch binder and 1 gram of potassic alum. The rolls absorbed between 45% and 55% of their weight of this solution. The saturated rolls were then dried and the gypsum dehydrated in an oven maintained at a temperature of 130° C. It required approximately 8 hrs. for the rolls to reach a temperature of 123–125° C. under the conditions used. The dried and dehydrated rolls weighed approximately 17% to 20% less than the dry gypsum-gauze rolls. This loss in weight included that of the gypsum lost in the dipping operation. The product was a porous, compact, essentially dustless plaster bandage roll. Upon immersing the roll in water, it absorbed between 55% and 65% of its weight in less than 30 seconds and retained its shape while in the water with practically no loss of plaster and the water was found to be evenly distributed throughout the body of the plaster. Circular casts were prepared from bandages from this roll and their strength determined. Their strength was found to be greater than that of similar casts prepared from loose commercial plaster of paris and equivalent lengths of gauze, and as much as 50% greater than similar casts prepared from the so called hard-coated bandages as marketed at present.

From a series of strength tests carried out on casts made from coated bandages prepared in the foregoing manner, it has been found that the initial setting of the plaster begins after the lapse of approximately five minutes, or a period similar to that of the commercial plaster. The strength then increases much more rapidly than in the case of the commercial plaster, until at the end of twenty minutes time the strength is approximately 50 per cent greater. At the end of thirty minutes, the cast has attained its maximum strength while in the wet state. The strength then remains constant for approximately twenty-four hours, when it again increases as the cast dries. The latter increase of strength, while desirable, is not important for the present purpose for obvious reasons.

From the foregoing it is obvious that the process of the present invention is capable of being varied within wide limits, readily apparent to those skilled in the art and such variations are to be considered within the scope of the present invention. The solvents and solutions in dipping or the rolls of gypsum and gauze or both may be heated to advantage as it serves to shorten the time required to dry and dehydrate the gypsum in the ovens.

In addition, winding the gypsum-gauze on suitable sized and shaped cores may be of advantage in some cases particularly when considerable lengths of bandage are made up into one roll. In this manner the cross section of the impregnated portion of the roll is reduced in size thus facilitating the transfer of heat in this portion. To this end, metallic cores, suitably shaped and sized preferably of metals that are unaffected by the materials used as for example, aluminum may be used. Such cores may readily be made from sheet material of light gauge, corrugated for added strength if desired and preferably perforated to facilitate the passage of liquids and permit the escape of steam generated in the process. Such cores, when properly shaped and when made for example of a light weight metal such as aluminum can readily be straightened after the bandage has been removed during application of a cast and used as reinforcing material in the cast. Such reinforcement when skillfully used doubles the effective strength of the cast. The use of such materials as reinforcements is well known but so far as I am aware the combined usages as described above are new and novel and are an added feature of the invention.

Figure 2:
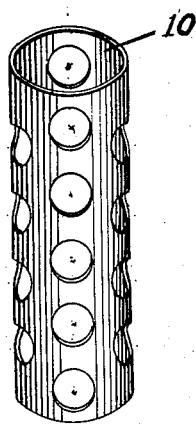

The features of the invention will be best appreciated from the consideration of one concrete embodiment thereof selected for purposes of illustration and shown in the accompanying drawing in which, Fig. 1 is a view in perspective of a bandage wound on a metal core, and Fig. 2 is a view in perspective of the core.

Fig. 1 illustrates a gypsum-gauze bandage wound in a coil upon a core which comprises a perforated cylinder of aluminum or other light and ductile metal.

In the preceding examples, unsized gauze was used in the preparation of the hard-coated bandages. Gauze sized with starch, resins and other materials may be used. For example, gauze sized with starch may be used to advantage where organic liquids are used in the preparation of the bandage. With water as the solvent, resin sized gauzes, particularly those sized with cumaron resin, were found to present certain advantages when used without affecting the strength of the casts prepared from them adversely. Gauze sized with resins are to a certain degree waterproofed and do not lose their stiffness to as great a degree when wet with water. Consequently, the dehydration of the plaster coated bandage and to some extent the application of the bandage is facilitated. The use of resin sized gauze in bandages of this nature is a further feature of this invention.

As an example of a method of manufacturing a coated plaster gauze or bandage by the use of a paste the following is given: 400 parts by weight of native gypsum containing 92% of calcium sulphate is ground in size to pass an 18-mesh screen and then mixed with 160 parts of water containing one part of soluble starch. The resulting paste is spread evenly on surgical gauze 32 by 28 mesh by a spreading knife. The coated gauze is then wound on a circular rack which is placed in an oven maintained at a temperature of about 130° C. Air is circulated through the oven during the course of drying and dehydrating the bandage, after which it may be removed, wound into a compact roll and cooled.

Several new and novel features in plaster bandages are secured by producing such bandages by the method of my invention and these may be briefly summarized as follows. By saturating the gypsum bandage with a solution of a binder and then drying, each particle of the gypsum is fixed in position. The subsequent operation of dehydrating the gypsum, not only serves this purpose but the steam released creates minute channels or pores throughout the mass, increasing its porosity and, consequently reducing the time necessary to soak the bandage subsequently. Furthermore, the binder being already fixed, does not flow and cover the potentially reactive surfaces of the particles from which the water of crystallization has been removed as the thin film coating the gypsum originally is destroyed or broken as the water is removed as steam from the particles. One would expect that the mass would be broken down during this operation but, as stated before, this does not happen, as is evident from the foregoing examples.

While the examples cited deal with a rolled plaster bandage, it is obvious that such bandages can readily be made in the form of splints, and preshaped plaster bandage masses that may or may not be suitably reinforced suitable for special purposes, and the like, and such bandages are also to be considered as within the scope of the present invention.

Having thus described my invention, what I claim as new and desire to secure by Letters Patent is:

1. In the manufacture of a plaster bandage, the steps of impregnating gauze with gypsum and winding to form a compact roll, saturating said roll with a liquid containing a binder, and heat treating the said saturated roll to dehydrate said gypsum to plaster of Paris.

2. In the manufacture of a plaster bandage, the steps of spreading powdered gypsum evenly on gauze, rolling the coated gauze, saturating the roll with a solution of a binding material, and dehydrating said gypsum to form plaster of Paris.

3. In the manufacture of a plaster bandage, the steps of spreading gypsum and a binding agent on gauze, rolling the covered gauze, saturating with a solvent for said binding agent, and dehydrating to form plaster of Paris.

4. In the manufacture of a plaster bandage, the steps of spreading on gauze powdered gypsum and a binding agent and a setting time regulating material, rolling the covered gauze, saturating with a solvent of the binding material, and dehydrating to form plaster of Paris.

5. In the manufacture of a plaster bandage the steps of saturating a laminated roll of gauze and gypsum with a binder and a solvent for said binder, and subsequently heat treating the saturated roll to remove said solvent and dehydrate the gypsum to form plaster of Paris.

6. In the manufacture of a plaster bandage, the steps of spreading powdered gypsum on gauze into a compact unit, rolling the coated gauze, saturating the unit with a solution of a binding material and an ingredient for regulating the setting time, and dehydrating the gypsum to form plaster of Paris.

7. In the manufacture of a plaster bandage unit, the steps of combining gauze, powdered gypsum and a binding agent in a compactly rolled mass, saturating with water the mass so formed, and then dehydrating the mass to form a compact self-sustaining porous unit which may be rendered plastic by immersion.

8. In the manufacture of a plaster bandage unit, the steps of combining gauze, powdered gypsum and a binding agent in a compactly rolled mass, adding by absorption approximately 50% of its weight of water, and dehydrating the mass to provide a compact porous unit having the capacity of taking up between 50% and 65% of its weight upon immersion in water and being thereby rendered plastic.

HARRY M. WEBER.